United States Patent [19]

Palmieri et al.

[11] Patent Number: 4,809,132

[45] Date of Patent: Feb. 28, 1989

[54] FIELD INSTALLABLE LINE AND LOAD LUG CONNECTORS FOR MOLDED CASE CIRCUIT BREAKERS

[75] Inventors: Joseph M. Palmieri, Southington; Roger N. Castonguay, Terryville; David Arnold, Chester; Robert A. Morris, Burlington, all of Conn.

[73] Assignee: General Electric Co., New York, N.Y.

[21] Appl. No.: 111,894

[22] Filed: Oct. 23, 1987

[51] Int. Cl.⁴ .................................... H02B 1/20

[52] U.S. Cl. .................................... 361/353; 335/202; 361/363; 361/375; 361/376; 439/810; 439/814

[58] Field of Search ............... 200/153 G; 335/8, 132, 335/202; 337/45; 361/346, 347, 350, 353-361, 363, 375-376, 426; 439/709, 715-716, 723-724, 810, 814

[56] References Cited

U.S. PATENT DOCUMENTS

| | | | |
|---|---|---|---|
| 3,534,195 | 10/1970 | Klein et al. | 200/166 |
| 3,551,876 | 12/1970 | Walter | 439/810 |
| 3,748,420 | 7/1973 | Rexroad | 439/814 |
| 4,589,052 | 5/1986 | Dougherty | 361/94 |
| 4,652,975 | 3/1987 | Scott | 361/404 |
| 4,679,016 | 7/1987 | Ciarcia et al. | 335/132 |

*Primary Examiner*—A. D. Pellinen
*Assistant Examiner*—Gregory D. Thompson
*Attorney, Agent, or Firm*—Richard A. Menelly; Walter C. Bernkopf; Fred Jacob

[57] ABSTRACT

Line and load lugs are fixedly attached to each pole of a multi-pole molded case circuit breaker without requiring screws. The lugs are positioned within the line and load lug compartments at opposing ends of the breaker by grooves formed along the sides of the lugs and rails formed within the internal surfaces of the compartments. A lug support cap fitted to the bottom of each line and load lug interacts with detents formed on the inner surfaces of the compartments to securely retain the line and load lugs within the compartments.

12 Claims, 3 Drawing Sheets

FIELD INSTALLABLE LINE AND LOAD LUG CONNECTORS FOR MOLDED CASE CIRCUIT BREAKERS

BACKGROUND OF THE INVENTION

Molded case circuit breakers for residential and commercial applications are generally provided with load and line lugs at the installation site by direct attachment to the circuit breaker line and load straps. U.S. Pat. No. 3,534,195 entitled "Circuit Breaker with Novel Terminal Strap" describes an industrial-rated molded case circuit breaker wherein the line and load lugs are attached to the line and load terminal straps by means of clearance holes formed through the bottom of the lugs and threaded opening formed through the ends of the straps.

When multi-pole industrial-rated circuit breakers are to be connected within large installations, the attachment of the line and load terminal lugs within each pole of each circuit breaker constitutes a labor intensive operation.

One purpose of the instant invention therefore is to provide a line and load terminal lugs arrangement whereby no such attaching screw is required to fixedly attach the line and load terminal lugs to corresponding line and load terminal straps arranged within the line and load lug compartments.

SUMMARY OF THE INVENTION

Industrial-rated molded case circuit breakers include protruding rails integrally formed within the interior surfaces of the line and load lug compartments to engage corresponding elongated grooves formed on the sides of the line and load terminal lugs which are inserted within the compartments. A lug support cap snappingly attached to the bottom of each lug interfaces with detents integrally formed on the interior surfaces of the compartments to securely retain lugs within their respective compartments.

BRIEF DESCRIPTION OF THE THE DRAWINGS

DESCRIPTION OF THE PREFERRED EMBODIMENT

Figure 1:
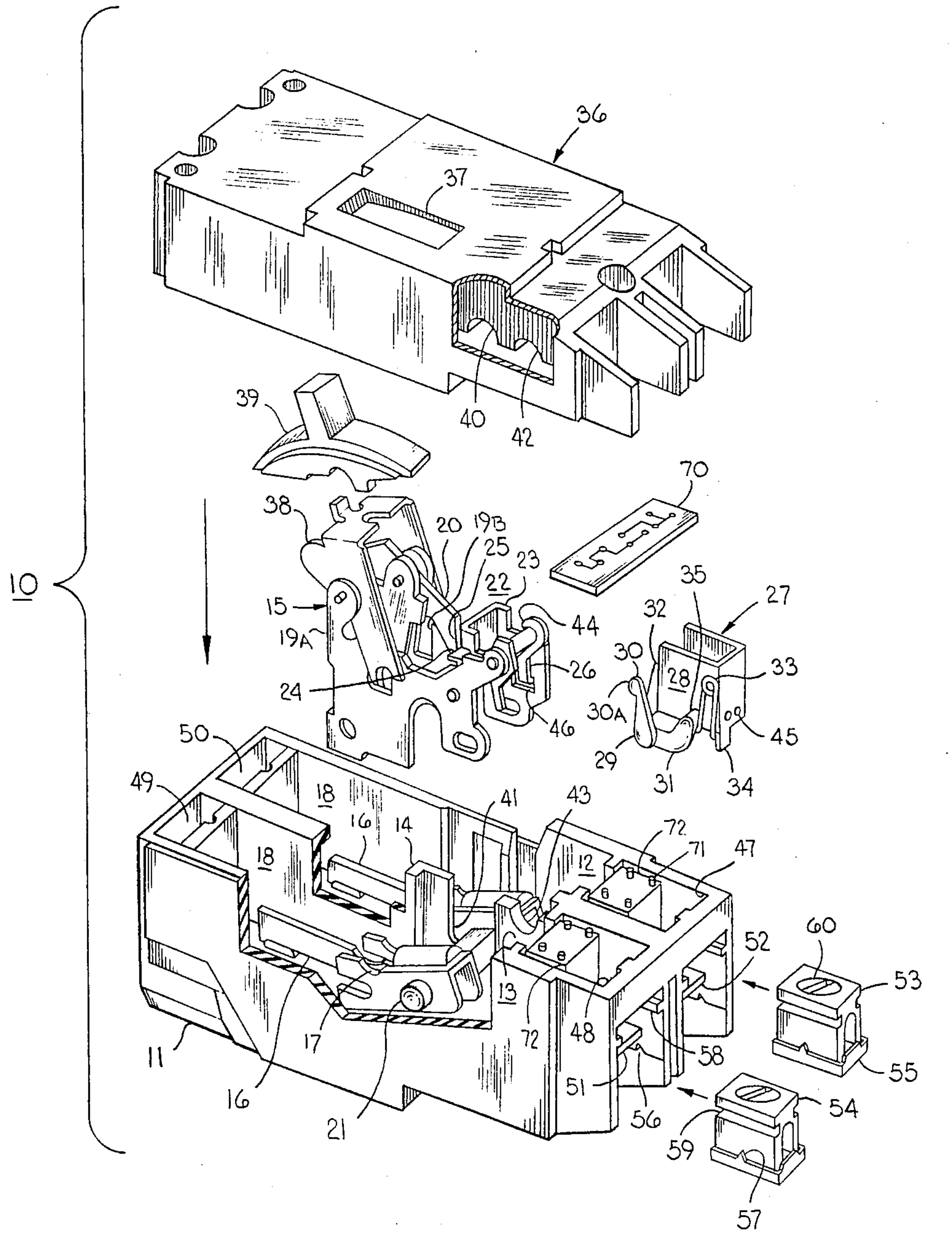
FIG. 1 is a top perspective view in isometric projection of a molded case circuit breaker including the terminal lug arrangement according to the invention.

An industrial-rated molded case circuit breaker having an ampere rating of 15 to 1,200 amperes is depicted at 10 in FIG. 1, wherein a molded plastic case 11 is arranged in a two-pole configuration with a first compartment 12 and a second compartment 13 integrally formed with the case and separated from each other by means of a dividing wall 14. An operating mechanism 15 of the type described in U.S. Pat. No. 4,679,016 entitled "Interchangeable Mechanism For Molded Case Circuit Breaker", is mounted in the first compartment over a contact arm carrier 17 which supports a movable contact arm 16. The completely assembled circuit breaker includes a fixed contact arm and means for electrical interconnection with an external circuit and, although not shown, is completely described within the referenced U.S. Patent which is incorporated herein for reference purposes and which should be reviewed for a better understanding thereof. The movable contact arm 16 extends within an arc chamber 18, which contains means for extinguishing an arc that occurs when the circuit breaker contacts are separated to interrupt the current through a protected circuit. The arc chute arrangement is also found within the aforementioned U.S. Patent. A similar contact arm and contact arm carrier are arranged within the second compartment 13 and are interconnected with the first movable contact arm 16 and contact arm carrier 17 by means of a crossbar 21, which extends between both compartments 12, 13 through a crossbar slot 41. When completely assembled, both contact arms move in unison under the operation of a circuit breaker handle 39 mounted to the operating mechanism 15 by means of a handle yoke assembly 38. The operating mechanism is assembled between a pair of side frames 19A, 19B, which carries an operating cradle 20 for latching the breaker contacts in a closed condition by the engagement of a cradle hook 25 with a primary latch 24 and also by means of a secondary latch 23 mounted to the operating mechanism by means of a secondary latch pivot 44. The entire latch assembly 22, consisting of the primary and secondary latches as described within the referenced U.S. Patent, further includes a trip bar 26 pivotally arranged for moving the secondary latch 23 away from the primary latch 24 to thereby allow the cradle to be released by the primary latch and move the movable contact arms into an open position. The handle 39 protrudes through a slot 37 arranged through the molded cover 36, which is securely attached to the molded case 11 by means of screws or rivets (not shown). In order to operate on the secondary latch 23 directly, a trip actuator, generally indicated at 27, is arranged within the second compartment 13 such that a mechanical actuator 29, including a first pivotally mounted lever 30 and a second lever 31, is arranged within the first compartment 12 while a magnetic module 28, a torsion spring 33 and a magnetic latch-piece 32 are arranged within the second compartment 13. An end 30A of the first lever 30 is arranged for interaction with a tab 46 on the secondary latch 23, while the second lever 31 engages the torsion spring 33 by means of a protrusion 35 integrally formed on the second lever 31 for biasing the spring 33 against a stop 34 integrally formed on the exterior of the magnetic module 28. Electrical connection with the magnetic module components is made by a plurality of terminals 45 arranged on the exterior of the magnetic module. The trip actuator components electrically interconnect with a trip unit 70 mounted on one of the current transformers 72 which are arranged around the load straps 51, 52 and which interconnect with the trip unit and each other by means of pins 71. The trip unit is in the form of a printed wire board such as described within U.S. Pat. No. 4,589,052 entitled "Digital I2T Pickup, Time Bands and Timing Control Circuits for Static Trip Circuit Breakers". The description of the interconnection between the current transformers and the printed wire board is formed within U.S. Pat. 4,652,975 entitled "Mounting Arrangement for Circuit Breaker Current Sensing Transformers", both of these Patents are incorporated herein for reference purposes. Electrical integrity between both poles is assured by the slots 41, 43 formed in the case 11 cooperating with corresponding slots 40, 42 formed in the cover 36, which allow the crossbar 21 and the first operating lever 30 to extend within the first compartment 12 without allowing any electrical access between the electrical components within both poles as best seen by referring now to both FIGS. 1 and 2.

Figure 2:
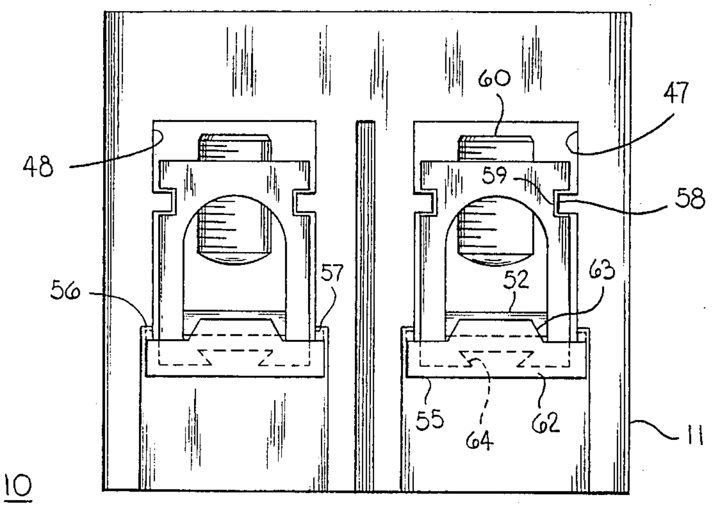
FIG. 2 is an end view of the circuit breaker of FIG. 1.
Figure 3:
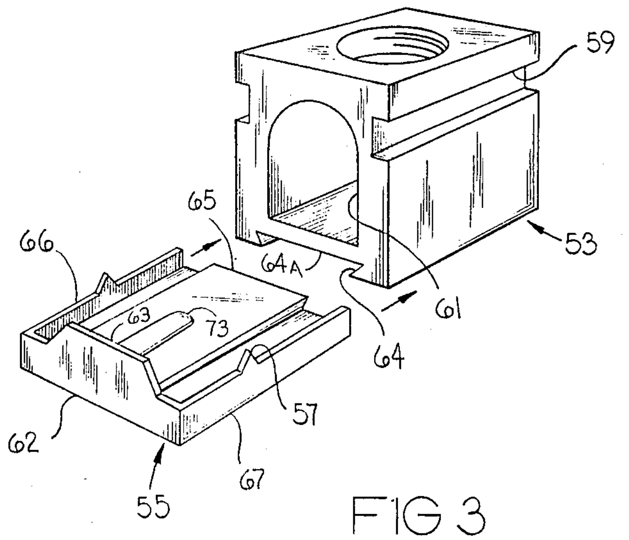
FIG. 3 is a front perspective view in isometric projection of the terminal lug arrangement of the invention prior to assembly.
Figure 4:
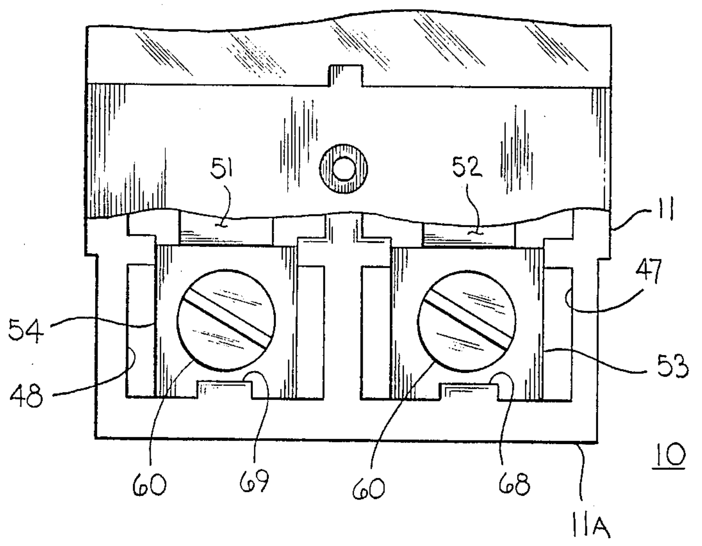
FIG. 4 is a top plan view of the assembled circuit breaker of FIG. 1 with the cover partially removed to show the terminal lug arrangement of the invention.

To allow connection with the external electrical circuits to be protected, a pair of load lugs 53, 54 are connected with the load straps 51, 52 which extend from the load lug compartments 47, 48. A similar pair of line lug compartments 49, 50 are provided on the opposite side of the circuit breaker case 11 to contain the line lugs (not shown). External electrical connection is made with the load lugs by means of the load terminal screws 60 attached to the top surface thereof. To facilitate field-installation of the load lugs, a pair of rails 58 are formed integrally with the circuit breaker case 11 on the interior opposing surfaces of the load lug compartments 47, 48. As shown in FIGS. 1, 2 and 3 a corresponding pair of elongated grooves 59 are formed on opposite sides of the load lugs. By capturing the rails 58 within the elongated grooves 59, the load lugs are restrained from moving in the vertical direction as viewed in FIG. 1. A lug support cap 55 is positioned on the bottom of the load lugs by means of a press-fit connection. The lug support cap can be fabricated from either an insulative material, such as plastic or from a resilient metal or metal alloy such as steel. When a metal lug support cap is employed, the spacing beneath the cap and the underlying support structure (not shown) must be maintained within the appropriate electrical code standards to prevent flashover from the load lugs to the support structure when energized. When a plastic lug support is employed, the lug support cap not only provides added electrical insulation to the load lugs but also serves to restrain the load lugs from moving in the horizontal direction, as viewed in FIG. 1. A pair of triangular projections 57 are formed on opposing sides of the plastic cap and are retained under corresponding detents 56 integrally formed on the opposing sides of the lug compartments 47, 48. When the load lugs are positioned within the lug compartments, the triangular projections 57, become entrapped under the detents such that the load lugs cannot be readily removed from the compartments. As best seen in FIG. 3, a dovetail projection 65 is formed on the bottom surface of the lug support cap 55 for insertion within the mortise groove 64 formed on the bottom of the load lugs, one of which is depicted at 53 in FIG. 3. The mortise groove 64 provided within the bottom of the load lugs, tightly holds the lug support cap to the load lug by a press-fit which occurs between the raised platform 73 formed on the top surface of the support cap and the bottom surface 64A of the mortise groove 64. Also shown are the elongated grooves 59 formed on the sides of the load lugs outboard the elongated slot 61 which receives the load strap 52 as best seen in FIG. 4. Referring back to FIG. 3, the lug support cap 55 is defined by a pair of opposing side walls 66, 67 each having the triangular projection 57 formed therein. A truncated raised part 63 is formed on the top surface of the end wall 62 such that when the lug support cap 55 is positioned on the load lug 53, the truncated raised part 63 polarizes the positioning of the load lug within the load lug compartment 47 as best seen by now referring back to FIG. 2. It is noted that the truncated raised part 63 would otherwise strike against the load strap 51 and thereby prevent the reverse attachment of the load lug within the load lug compartment 47 of FIG. 1.

Figure 5:
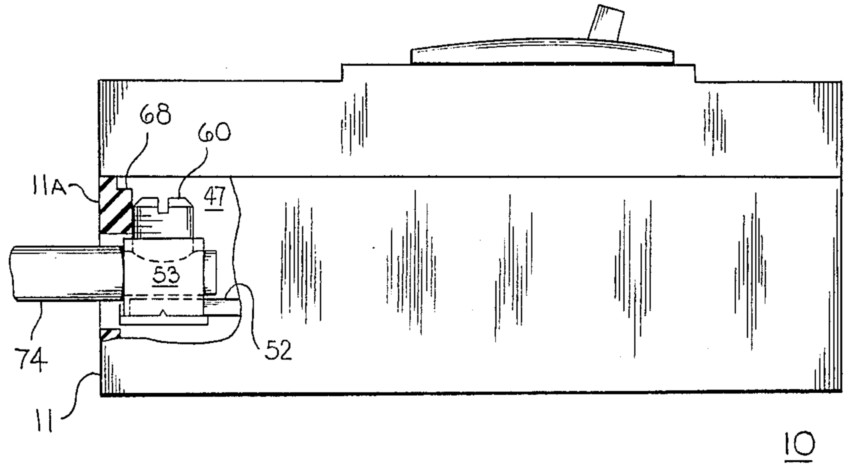
FIG. 5 is a side view of the assembed molded case circuit breaker of FIG. 1 in partial section, depicting the terminal lug arrangement of the invention attached to an electrical distribution power cable.

The circuit breaker 10 is shown in FIGS. 4 and 5 with the load lugs 53, 54 attached to their respective load straps 52, 51 and within their respective load compartments 47, 48 as indicated. The load terminal screws 60 are readily accessible from the top of the breaker to facilitate electrical connection between the load lugs 53, 54 and the external circuit. In order to provide added mechanical support to the load terminal lugs 53, 54 while providing electrical clearance between the lugs and electrical ground, a pair of projections 68, 69 are integrally formed within an end wall 11A of the circuit breaker case 11 superadjacent the load lugs 53, 54. The load terminal screws 60 are trapped against the projections, one of which 53 is shown in FIG. 5 and hence are constrained from outward movement when the terminal screws 60 are attached to the power distribution cables 74. Although not shown, the line lugs are attached to the line straps in a similar manner and are also retained under similar projections formed within the end wall of the circuit breaker case. The provision of the triangular projections 57, dovetail projection 65 and truncated raised part 63 or the lug support cap 55 shown earlier in FIG. 3 are important features of this invention. Further important features are the provision of the mortise groove 64 and elongated grooves 59 formed in the load lugs 53, 54 to mount on the rails 58 (FIG. 2) to facilitate field-installation of the load lugs to the circuit breaker case.

Having thus described our invention, what we claim as new and desire to secure by Letters Patent is:

1. A molded case circuit breaker terminal lug arrangement comprising in combination:
   - a terminal lug metal block and a molded case circuit breaker terminal lug compartment;
   - said terminal lug metal block having an elongated slot formed therethrough for receiving a circuit breaker terminal strap, said block including a pair of elongated grooves formed on an outer surface of opposing side walls interfacing with a corresponding pair of rails formed on an inner surface of said molded case circuit breaker terminal lug compartment.

2. The terminal lug arrangement of claim wherein said terminal lug metal block includes a shaped elongated slot formed in a bottom surface thereof for receiving a lug support cap.

3. The terminal lug arrangement of claim 2 including a pair of side walls on said lug support cap joined by an end wall at one end, said side walls including a first projection for interacting with a detent formed on said inner surface to thereby deter removal of said terminal lug metal block from said terminal lug compartment.

4. A molded case circuit breaker terminal lug arrangement comprising:
   - a terminal lug metal block having an elongated slot formed therethrough for receiving a circuit breaker terminal strap, said block including a pair of elongated grooves formed on an outer surface of opposing side walls for interfacing with a corresponding pair of rails formed on an inner surface of a molded case circuit breaker terminal lug compartment;

a shaped elongated slot formed in a bottom surface thereof receiving a lug support cap;

a pair of side walls on said lug support cap joined by an end wall at one end, said side walls including a first projection for interacting with a detent formed on said inner surface to thereby deter removal of said terminal lug metal block from said terminal lug compartment; and a second projection on said end wall to prevent said terminal lug metal block from being inserted within said terminal lug compartment from said one end.

5. The terminal lug arrangement of claim 3 or 4 including a third projection formed on an inner surface of said circuit breaker terminal lug compartment whereby a part of said third projection abuts a terminal lug screw within said terminal lug metal block to deter removal of said terminal lug metal block from said terminal lug compartment.

6. The terminal lug arrangement of claim 2 or 4 wherein said shaped slot comprises a mortise.

7. The terminal lug arrangement of claim 5 wherein said lug support cap includes a fourth projection on a bottom thereof for inserting within said shaped elongated slot.

8. The terminal lug arrangement of claim 7 wherein said fourth projection comprises a dovetail.

9. The terminal lug arrangement of claim 3 or 4 wherein said first projection comprises a triangle.

10. The terminal lug arrangement of claim 4 wherein said second projection comprises a truncated triangle.

11. The terminal lug arrangement of claim 2 or 4 wherein said lug support cap comprises an insulator.

12. The terminal lug arrangement of claim 2 or 4 wherein said lug support cap comprises a metal.

* * * * *